April 1, 1941.    E. M. STANBERY    2,237,013
VALVE ASSEMBLY
Filed Oct. 20, 1938    2 Sheets-Sheet 1

Inventor:
Elwood M. Stanbery,
by Harry E. Dunham
His Attorney.

April 1, 1941.  E. M. STANBERY  2,237,013
VALVE ASSEMBLY
Filed Oct. 20, 1938   2 Sheets-Sheet 2

Inventor:
Elwood M. Stanbery,
by Harry E. Dunham
His Attorney.

Patented Apr. 1, 1941

2,237,013

UNITED STATES PATENT OFFICE 2,237,013

VALVE ASSEMBLY

Elwood M. Stanbery, Fort Wayne, Ind., assignor to General Electric Company, a corporation of New York Application October 20, 1938, Serial No. 236,125

6 Claims. (Cl. 137—153)

My invention relates to valve assemblies for refrigerant compressors or the like.

It is an object of my invention to provide a valve assembly for refrigerant compressors or the like which is rugged in construction and efficient in operation.

Further objects and advantages of my invention will become apparent as the following description proceeds and the features of novelty which characterize my invention will be pointed out with particularity in the claims annexed to and forming a part of this specification.

Figure 1:
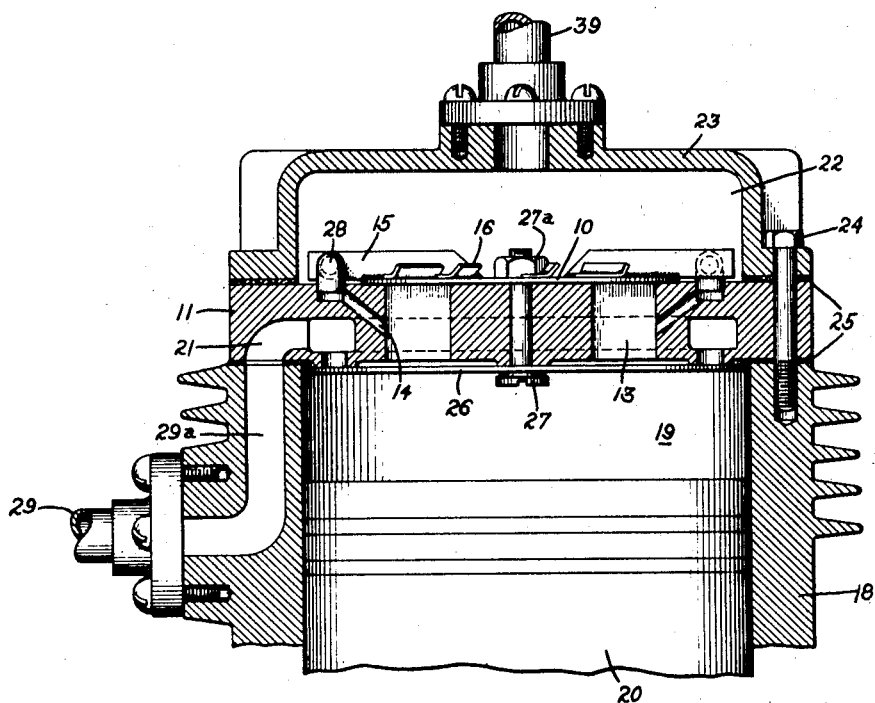
Figure 2:
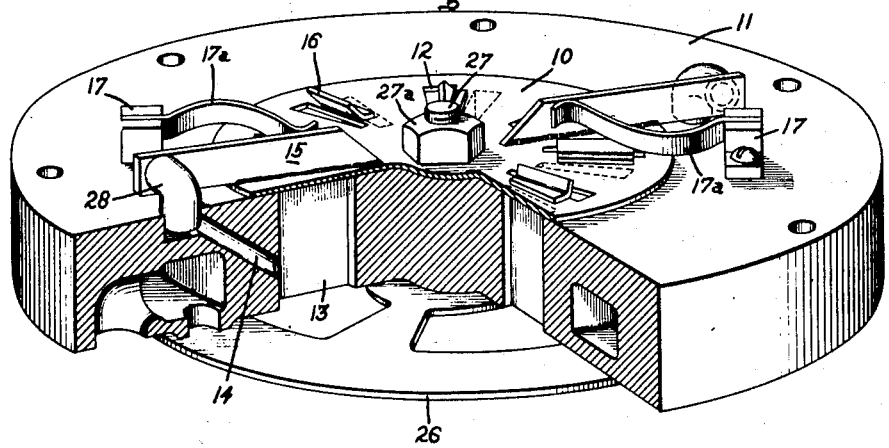
Figure 3:
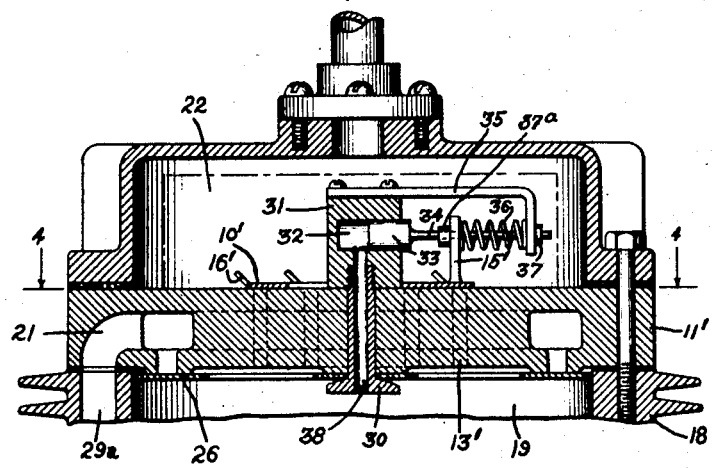
Figure 4:
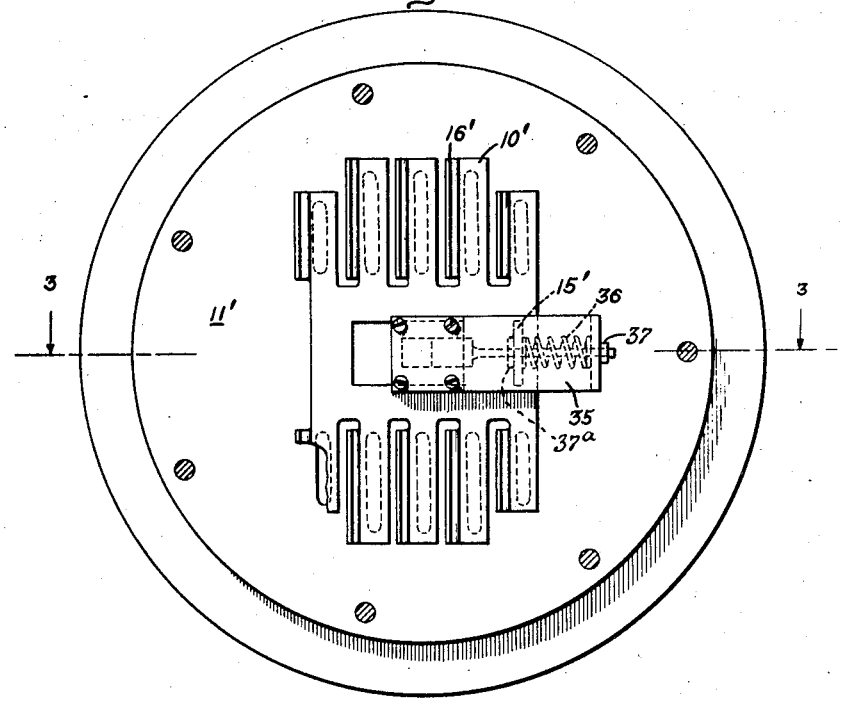

For a better understanding of my invention reference may be had to the accompanying drawings in which Fig. 1 is a side elevation, partly in section, of the end of a compressor cylinder provided with a valve assembly embodying my invention; Fig. 2 is a perspective view, partly cut away, of the valve assembly shown in Fig. 1; Fig. 3 is a side elevation, partly in section, of the end of a compressor cylinder provided with a valve assembly embodying a modification of the valve assembly shown in Fig. 1; and Fig. 4 is a transverse section taken along the line 4—4 of Fig. 3. The same numerals refer to corresponding parts in the various figures.

In accordance with my invention, as illustrated in Figs. 1 and 2, I have provided a pressure and velocity actuated valve comprising a valve disk 10 which is movably supported on a body such as a valve plate 11. In the closed position of the valve, openings or slots 12 in the valve disk are out of correspondence with the main exhaust ports 13 in the valve plate 11. In order to open the valve I utilize an auxiliary discharge passage 14 through which the compressed fluid passes and acts upon an excited or pilot arm 15 which initiates movement of the valve disk 10. Slight movement of valve disk 10 uncovers a portion of exhaust ports 13 and permits the compressed fluid to pass through the slight opening between the openings or slots 12 and the exhaust ports 13. A main operating member such as an inclined vane 16 is secured to valve disk 10 adjacent each slot 12 in such a way that the exhaust fluid is directed against the vanes 16, the force resulting therefrom causing the valve disk 10 to move until openings 12 are in complete alignment with exhaust ports 13. The movement of valve disk 10 is opposed by a retaining spring 17a, the spring serving to return the valve disk 10 to its closed position when the flow of exhaust fluid diminishes sufficiently to permit substantial equalization of pressure on the two sides of the valve plate 11.

Describing the apparatus including my invention in greater detail, with particular reference to Figs. 1 and 2, I have shown a refrigerant compressor cylinder 18 provided with a longitudinal cylindrical bore 19 in which a cylindrical piston 20 is reciprocated by any suitable driving arrangement. The open end of the cylinder 18 is closed by a valve assembly embodying my invention. The valve assembly includes a valve plate 11 made of steel or the like. The valve plate 11 is provided with an inlet passage 21 and a series of exhaust passages 13 extending therethrough. The discharge or exhaust passages communicate with an exhaust manifold 22 contained within a cylinder head 23. The cylinder head 23 and valve plate 11 are securely fastened to the cylinder 18 by means of a plurality of bolts 24, gaskets 25 being clamped between the cylinder 18 and valve plate 11 and between valve plate 11 and cylinder head 23, respectively, in order to insure fluid-tight joints between the respective parts of the apparatus.

An intake valve 26 is secured to the under side of valve plate 11 by means of a bolt 27 extending through the valve plate 11 and suitably secured thereto, as by means of a nut 27a. The exhaust valve or valve disk 10 is retained on the upper side of the valve plate 11 by means of the bolt 27 and nut 27a.

In order to permit the compressed fluid to be exhausted during the compression stroke, I have provided a plurality of auxiliary operating members or exciter arms 15 secured to the valve disk 10 in any suitable fashion as by welding, for example. Two exciter arms have been illustrated. An exhaust nozzle 28 communicating with an exhaust port 13 by means of auxiliary discharge passage 14 is associated with each exciter arm or auxiliary operating member 15. Normally, the exciter arm is urged into a position closing the exhaust nozzle 28 by means of a retaining spring 17a or other suitable means. As illustrated in Fig. 2, a spring arm has been illustrated, one end of which bears against the exciter arm 15, the other end of the spring being fastened to the valve plate through the agency of a spring retainer 17. Spring retainer 17 also serves as a stop to limit the amount of valve travel, thereby preventing valve disk 10 from rotating beyond the open position (in the clockwise direction, as viewed in Fig. 2). I have provided a plurality of slots or openings 12 in the valve disk 10 which match with a plurality of exhaust ports or passages 13 in the valve plate 11 in the open position of the exhaust valve 10.

In order to utilize the velocity and pressure of the compressed fluid for rotating the valve disk 10, I have provided a vane 16 adjacent each slot or opening 12. These vanes 16 may be separately formed and suitably secured to the valve disk 10 or they may be punched out from the valve disk 10 thereby forming the slot 12 and the vane 16 in one operation. Vanes 16 extend over the openings 12 and are inclined at the proper angle for obtaining the greatest effect of the gas velocity and pressure.

The operation of this valve is as follows: Assuming that the valve disk 10 is in the closed position as shown in Fig. 2 during the intake stroke of the piston 20, the fluid to be compressed is drawn into the inlet passage 21 in the valve plate 11 from the inlet conduit 29 and passage 29a in the wall of cylinder 18. On the compression stroke of piston 20, as the fluid pressure builds up on the underside of the valve disk 10 and exceeds the pressure above it, fluid discharges through the exhaust passages 13, auxiliary discharge passages 14 and exciter exhaust ports 28 against exciter arms 15 and initiates rotation of the valve disk 10 against the bias of spring 17a. As the valve disk 10 rotates, the slots 12 in the valve disk 10 partially uncover the discharge ports 13 thereby permitting the compressed fluid to escape into the exhaust manifold or chamber 22. The escaping fluid is directed against the vanes 16 and the velocity force resulting therefrom tends to rotate the valve further until arms 15 contact stops 17. When the fluid pressures on both sides of the valve approach equalization by reason of the escape of the compressed fluid through exhaust conduit 39, and the decrease of pressure below the valve 10 following completion of the exhaust stroke, the retaining spring 17a operates to rotate the valve disk 10 in a counter-clockwise direction as viewed in Fig. 2, thereby closing the exhaust valve.

In Figs. 3 and 4, I have illustrated a modification of the exhaust valve described above. The intake assembly is the same as in the above-described embodiment. In this case, however, the intake and exhaust valves 26 and 10' respectively are supported on valve plate 11' by means of a bolt 30 which threadingly engages a block 31 in exhaust chamber 22. Bolt 30 is provided with an axial passage 38 communicating between cylindrical bore 19 of cylinder 18 and a chamber 32 in block 31. A piston or plunger 33 is reciprocally arranged within the chamber 32 in block 31 and is guided in its sliding movement by means of a rod 34 attached to one end of the piston 33 and passing through an arm 35. Arm 35 may be secured in any suitable manner to block 31 or if preferred, arm 35 may be secured to the valve plate 11'. The rod 34 also extends through exciter arm 15' which is suitably secured to valve disk 10'. In the modification illustrated by Figs. 3 and 4, the exhaust valve or valve disk 10' is slidably related to valve plate 11' instead of being rotatably supported as in the first-described embodiment. A spring 36 is interposed between arm 35 and exciter arm 15' in order to bias the valve disk 10' to the closed position. A collar 37 suitably secured to rod 34 limits the motion of the rod 34 to the left as viewed in Fig. 3 thereby insuring that the passage 38 in bolt 30 will always be in communication with cylinder bore 19. A second collar 37a suitably secured to rod 34 transmits the movement of piston 33 and rod 34 to the exciter arm 15' and valve disk 10'.

Assuming that the valve 10' is in the closed position as shown in Figs. 3 and 4, the operation of this modification of my invention is as follows: Compressed fluid from within the cylinder passes through the passage 38 in bolt 30 into chamber 32 and exerts pressure on piston 33. When this force is great enough to overcome the forces exerted by the pressure in the exhaust chamber 22 and the spring 36, the exhaust valve 10' is moved to the right, as viewed in Fig. 3, to uncover portions of passages 13'. Escaping fluid passes through exhaust ports 13' and is directed against the vanes 16', the resulting force acting to completely open the valve 10'. When the gas pressures in the cylinder bore 19 and exhaust manifold 22 approach equalization, spring 36 assumes control of the valve disk 10' and closes the exhaust valve.

With respect to the modification shown in Figs. 3 and 4, the vanes 16' may be eliminated by using a piston 33 which is large enough to completely open the valve.

While I have shown a particular embodiment of my invention in connection with a valve assembly for compressors or the like, I do not desire my invention to be limited to the particular construction shown and described and I intend in the appended claims to cover all modifications within the spirit and scope of my invention.

What I claim as new and desire to obtain by Letters Patent of the United States is:

1. In a valve structure for compressors or the like, a valve plate having a main exhaust port therein through which fluid to be discharged passes, a discharge valve disk movably supported on said valve plate for closing said exhaust port, a vane on said valve disk, and means for initiating opening of said valve including an auxiliary exhaust port in said valve plate, and an exciter arm operatively associated with said valve disk for controlling flow through said auxiliary exhaust port, said means being arranged for moving said valve to uncover a portion of said main exhaust port whereby the high velocity compressed fluid is directed against said vane for completing the opening of said valve.

2. In a valve structure for compressors or the like a valve plate having a main exhaust port therein through which fluid to be discharged passes, a discharge valve disk movably supported on said valve plate for closing said exhaust port, a vane on said valve disk, means for initiating opening of said exhaust port including an auxiliary exhaust port in said valve plate, and an exciter arm operatively associated with said valve disk and said auxiliary exhaust port for moving said valve to uncover a portion of said main exhaust port whereby the high velocity compressed fluid is directed against said vane for completing the opening of said valve, and means for closing said valve when the flow of compressed fluid diminishes sufficiently to permit substantial equalization of pressure on the two sides of said valve plate.

3. In a valve structure for compressors or the like, a valve plate having a main exhaust port therein through which fluid to be discharged passes, a discharge valve disk movably supported on said valve plate for closing said main exhaust port, a vane on said valve disk, means including an auxiliary exhaust port in said valve plate, and an exciter arm operatively associated with said valve disk and said auxiliary exhaust port for moving said valve to uncover a portion of said main exhaust port whereby the high velocity compressed fluid is directed against said vane for completing the opening of said valve, means to limit the movement of said valve and spring means acting on said exciter arm to close said auxiliary port and for causing said disk to close said main exhaust port when the force of the compressed fluid acting to open said valve is less than the force tending to close said valve.

4. In a valve assembly for compressors or the like, the combination of a valve plate having an exhaust passage therethrough, a valve disk rotatably supported on said valve plate for closing said exhaust passage, an opening in said valve disk, a vane on said valve disk adjacent said opening and extending at least part way across said opening, means including an exciter arm on said valve disk and an auxiliary exhaust passage in said valve plate for rotating said valve disk to partially align said opening and said exhaust passage whereby the compressed fluid is directed against said vane to complete the alignment of said opening and said exhaust passage, means to limit the rotation of said valve and spring means supported on said valve plate and acting on said exciter arm for closing said discharge passage and said auxiliary discharge passage when the pressure of the compressed fluid acting to open said valve becomes less than the force tending to close said valve.

5. In a valve assembly for compressors or the like, the combination of a valve plate having an exhaust passage therethrough a valve disk slidably supported on said valve plate for closing said exhaust passage, an opening in said disk, a vane on said valve disk, said vane being adjacent said opening and extending at least part way across said opening, means for sliding said valve disk to partially uncover said exhaust passage whereby the compressed fluid to be discharged is permitted to react against said vane to open said valve, said means including a hollow block secured to said valve plate, a passage through the valve plate communicating with the hollow portion of said block, a plunger adapted to reciprocate in said hollow portion of said block, and a connection between said plunger and said valve disk, and spring means acting on a portion of said connection for closing said exhaust port.

6. A valve structure for compressors or the like comprising a body having a main port therethrough, a valve for closing said main port, a main operating member operatively associated with said valve, and means for initiating the opening of said valve including an auxiliary port through said body and an auxiliary operating member operatively associated with said valve and controlling fluid flow through said auxiliary port, said means being arranged for moving said valve to uncover a portion of said main port whereupon the compressed fluid is directed against said main operating member for completing the opening of said valve.

ELWOOD M. STANBERY.